United States Patent [19]
Hsu

[11] Patent Number: 5,829,771
[45] Date of Patent: Nov. 3, 1998

[54] FOLDABLE BICYCLE CARRIAGE

[76] Inventor: Hsiu-Lu Hsu, No. 22, Lane 245, Section 2, San Min Road, Pan Chiao City, Taiwan

[21] Appl. No.: 725,093

[22] Filed: Oct. 2, 1996

[51] Int. Cl.$^6$ .................................................. B62K 27/12
[52] U.S. Cl. .......................... 280/204; 280/292; 280/486; 280/644; 280/656
[58] Field of Search .................................... 280/204, 292, 280/486, 641, 642, 644, 647, 650, 656, 657, 658

[56] References Cited

U.S. PATENT DOCUMENTS

| | | | |
|---|---|---|---|
| 4,645,370 | 2/1987 | Kassai | 280/644 |
| 4,721,320 | 1/1988 | Creps | 280/204 |
| 5,267,744 | 12/1993 | Berry | 280/204 |
| 5,577,746 | 11/1996 | Britton | 280/204 |
| 5,687,980 | 11/1997 | Eckroth | 280/204 |

*Primary Examiner*—Anne Marie Boehler
*Attorney, Agent, or Firm*—Bacon & Thomas

[57] ABSTRACT

A foldable bicycle carriage including a base frame, a support frame, two upper folders, two lower folders, a drag link, a wheel shaft, two wheels, a base board and a cover. Each of the upper and lower folders includes a frame seat for securing the upper and lower folders respectively under a rear edge of the support frame and on a rear edge of the base frame. The upper and lower folders can be inward folded to reduce the volume of the entire frame body of the carriage so as to facilitate the storage and transferring thereof. An insertion pin seat is disposed at the front end of the drag link and is directly tightened by a manually operable plum blossom-shaped thread sleeve. The insertion pin seat is further located by a safety pin. The bicycle carriage can be easily assembled and conveniently used.

3 Claims, 8 Drawing Sheets

FOLDABLE BICYCLE CARRIAGE

BACKGROUND OF THE INVENTION

The present invention relates to a foldable bicycle carriage which is connected to the rear end of the bicycle for carrying a child or other articles. The bicycle carriage can be easily and quickly assembled.

The existing bicycle includes a seat for the rider and an article bracket disposed at the rear end of the frame body of the bicycle. Therefore, in fact, the bicycle is only for a single user to ride. However, when it is necessary for the rider to drive another person, the person must sit on the article bracket. In the case of an infant or a child, it will be impossible for the infant or the child to stably sit on the article bracket and serious injury may take place in case the infant or the childs drops down from the bicycle. Moreover, when sitting on the article bracket, the feet of the sitter are apt to be rolled into and injured by the spokes of the bicycle. Therefore, it is necessary to provide a safety sitting measure for the child so as to avoid accident during riding the bicycle.

Taiwanese Utility Model Application No. 84212446 discloses a bicycle carriage for carrying a child during riding the bicycle. The child can safely sit in the carriage without danger.

However, the above bicycle carriage includes complicated structure which is difficult to manufacture. Also, the cost for manufacturing the bicycle carriage is very high. The bicycle carriage mainly includes a base frame, a support frame, four fixing means for the support frame, a drag link, two wheels, a base board and a sun shade. The fixing means are disposed between the short members of the base frame and the front and rear ends of the support frame. Each fixing means is mainly composed of a sleeve, a brake cam and a spring. The entire structure of the bicycle carriage is quite complicated.

SUMMARY OF THE INVENTION

It is therefore a primary object of the present invention to provide a foldable bicycle carriage connected to the rear end of the bicycle and dragged thereby. The bicycle carriage can be easily and quickly assembled and folded.

According to the above object, the foldable bicycle carriage includes a base frame, a support frame, two upper folders, two lower folders, a drag link, a wheel shaft, two wheels, a base board and a cover.

The base frame is a rectangular frame body and front end of the base frame is disposed with upward bent slipproof sections.

The support frame is a U-shaped frame having two free ends formed with thread holes. Each upper folder includes a frame seat for securing the upper folder under a rear edge of the support frame. The inner sides of the frame seat are formed with open sectional sections. A ball joint is screwed through the frame seat into the thread hole of the support frame. An end of an upper support member is formed with a fitting section for enclosing the ball joint. The fitting section is processed and riveted to universally rotatably fasten the ball joint in the frame seat. A movable pin is inserted in the pin holes of the frame seat for locating the upper support members.

Each lower folder includes a frame seat for securing the lower folder on a rear edge of the base frame. The inner sides of the frame seat are formed with open sectional sections. A lower support member is fitted into the frame seat and secured therein by a fixing pin. A movable pin is passed through the pin holes of the edges of the open sectional sections so as to locate the lower support member.

The drag link is a substantially straight but slightly curved lever. An insertion pin seat is pivotally disposed at a front end of the drag link. A rear end of the drag link by a pin member is coupled with a locating board welded on a lateral side of the base frame.

The wheels are freely rotatably connected with the carriage by means of the wheel shaft which is passed through the shaft holes of the fixing plates welded under the base frame.

The base board is formed with two lateral locating recesses for securing the base board on the base frame.

The cover is made of waterproof canvas by sewing. Two lateral sides of the cover are disposed with windows made of mesh-like fabric. A turnable door made of laminated mesh-like fabric and transparent plastic fabric is disposed on front side of the cover. An openable door is disposed on rear side of the cover, which can be opened by a zipper.

The present invention can be best understood through the following description and accompanying drawing, wherein:

DETAILED DESCRIPTION OF THE PREFERRED EMBODIMENT

Figure 1:
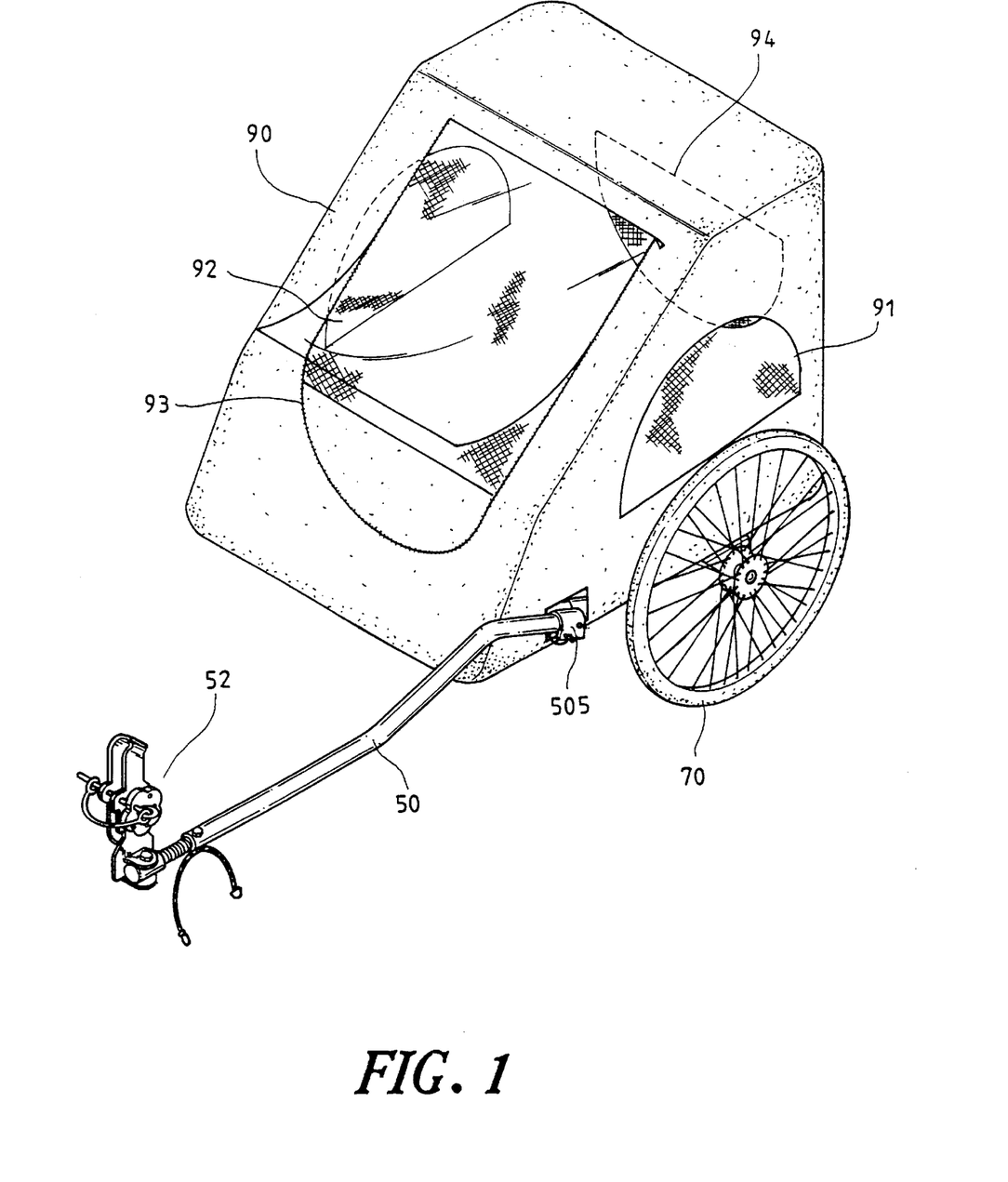
FIG. 1 is a perspective assembled view of the bicycle carriage of the present invention.
Figure 2:
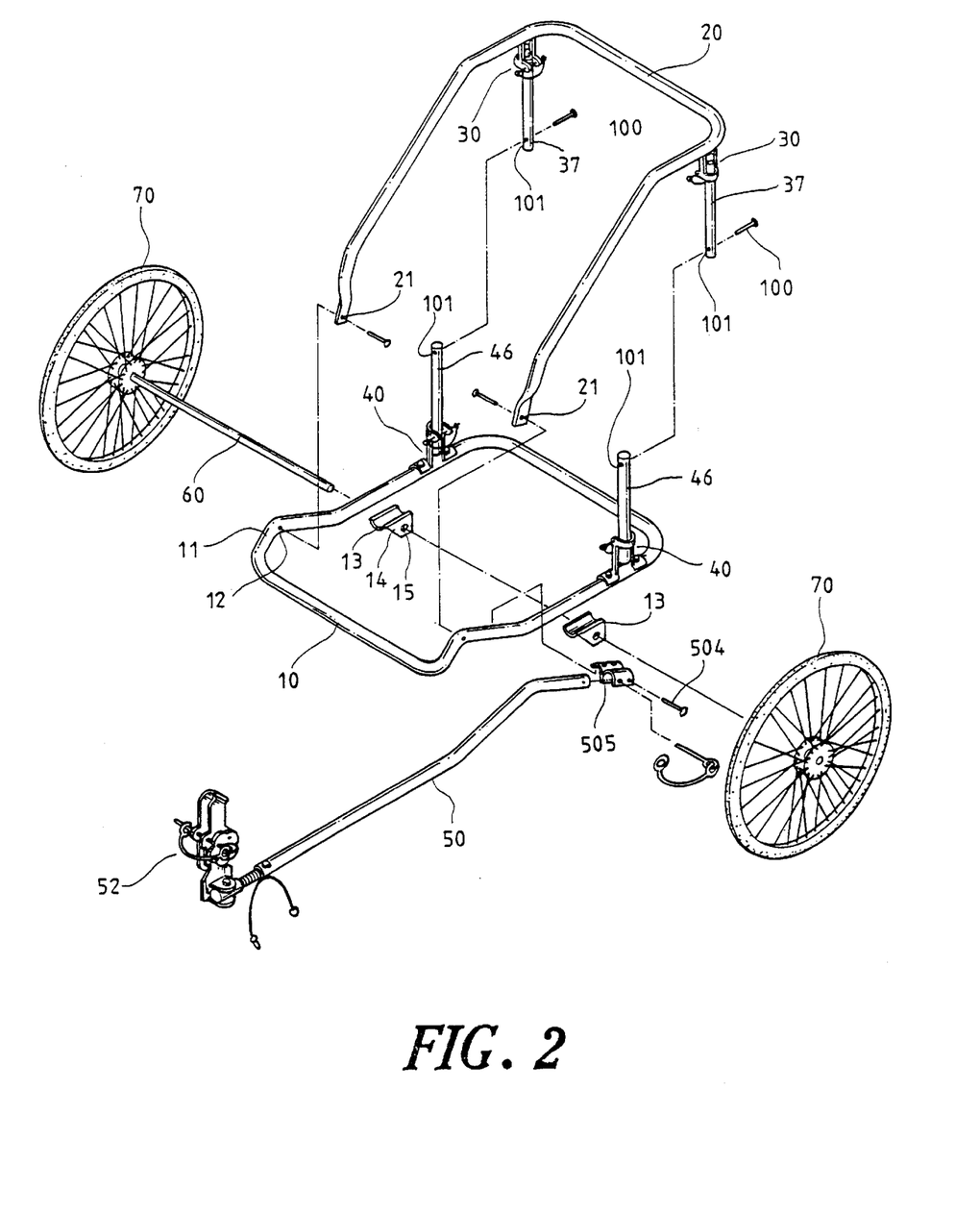
FIG. 2 is a perspective exploded view of the bicycle carriage of the present invention.

Please refer to FIGS. 1 and 2. The foldable bicycle carriage of the present invention includes a base frame 10, a support frame 20, two upper folders 30, two lower folders 40, a drag link 50, a wheel shaft 60, two wheels 70, a base board 80 and a cover 90.

The base frame 10 is a rectangular frame body. The front end of the base frame 10 is disposed with upward bent slipproof sections 11 formed with thread holes 12. Two fixing plates 13 are disposed with downward extending plate boards 14 formed with shaft holes 15.

The support frame 20 is a U-shaped frame having two free ends formed with thread holes 21.

Figure 3:
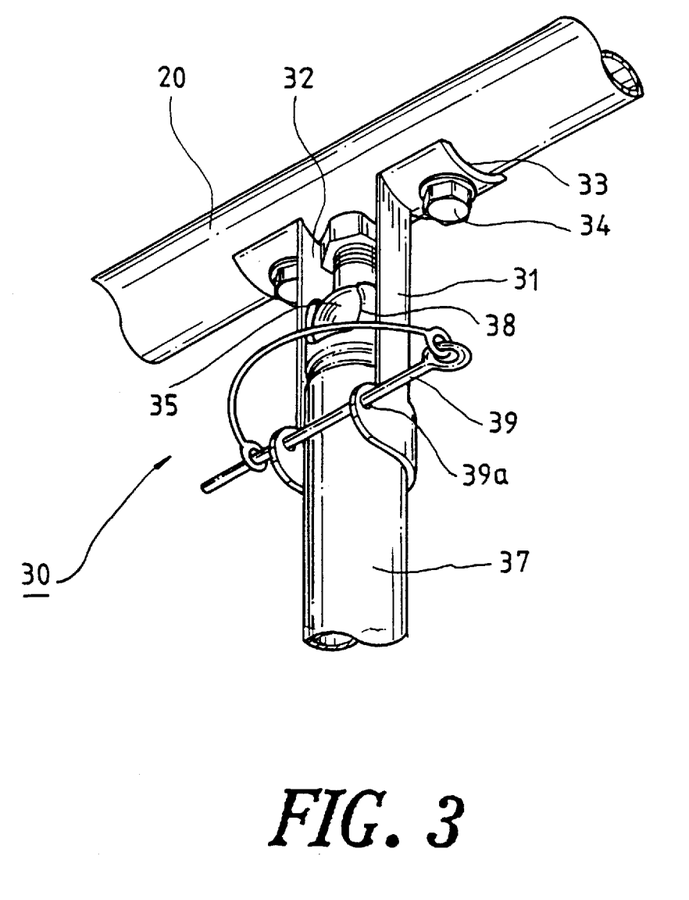
FIG. 3 is a perspective assembled view of the upper folder of the present invention.
Figure 4:
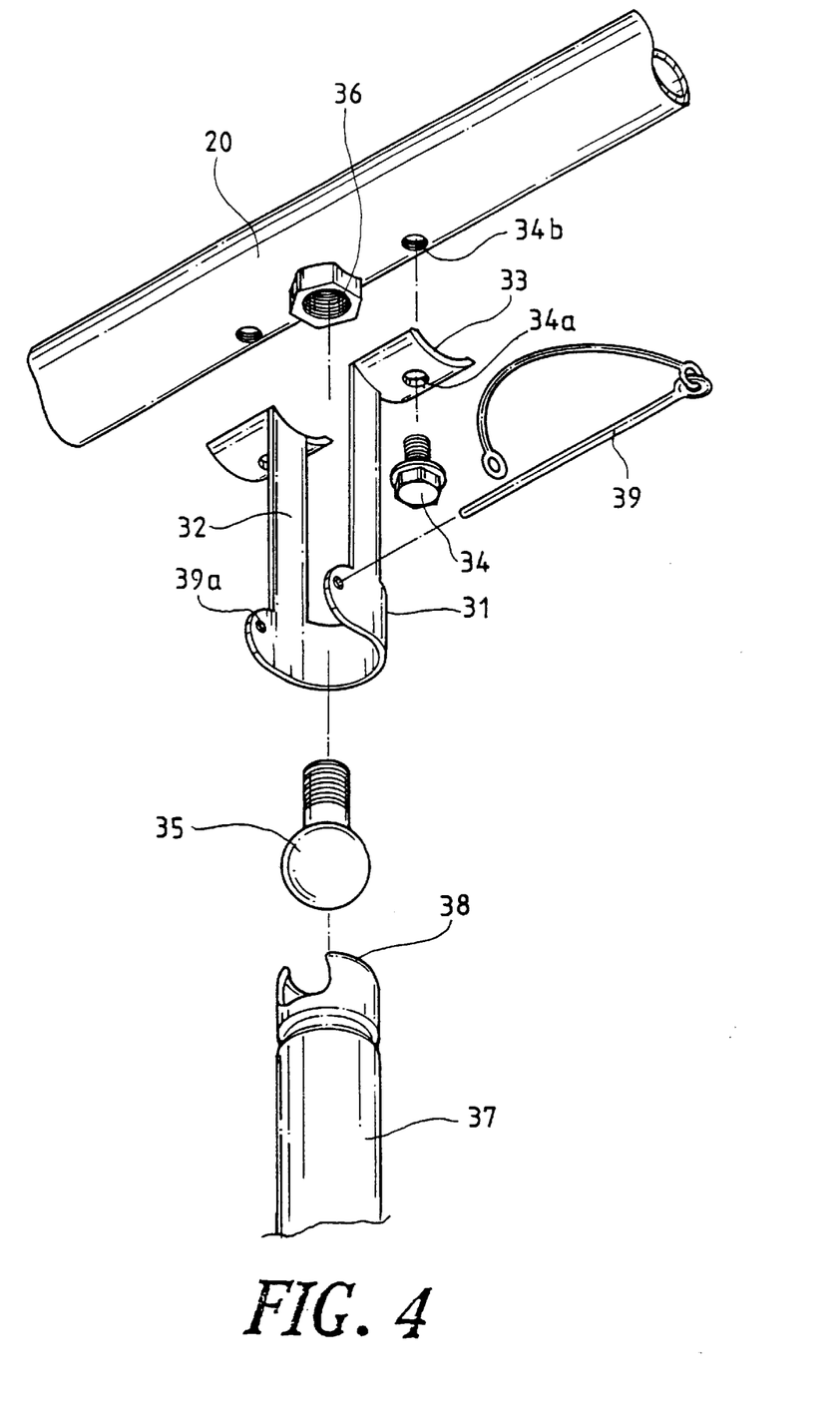
FIG. 4 is a perspective exploded view of the upper folder of the present invention.

The upper folders 30 are disposed under rear edge of the support frame 20 (referring to FIGS. 3 and 4). Each upper folder includes a frame seat 31. The inner sides of the frame seat are formed with open sectional sections 32. The bottom board of the frame seat is formed with an arch edge 33. A bolt 34 is passed through the thread holes 34a, 34b to secure the frame seat 31 on the support frame 20. A ball joint 35 is screwed through the frame seat into the thread hole 36 of the support frame. The end of an upper support member 37 is formed with a fitting section 38 for enclosing the ball joint. The fitting section 38 is processed and riveted to universally rotatably fasten the ball joint 35 in the frame seat. A movable pin 39 is passed through the pin holes 39a of the edges of the open sectional sections 32 so as to locate and prevent the upper support member 37 from dropping out of the open sectional sections 32. When it is desired to fold the upper support member 37, the movable pin 39 must be first extracted outward.

Figure 5:
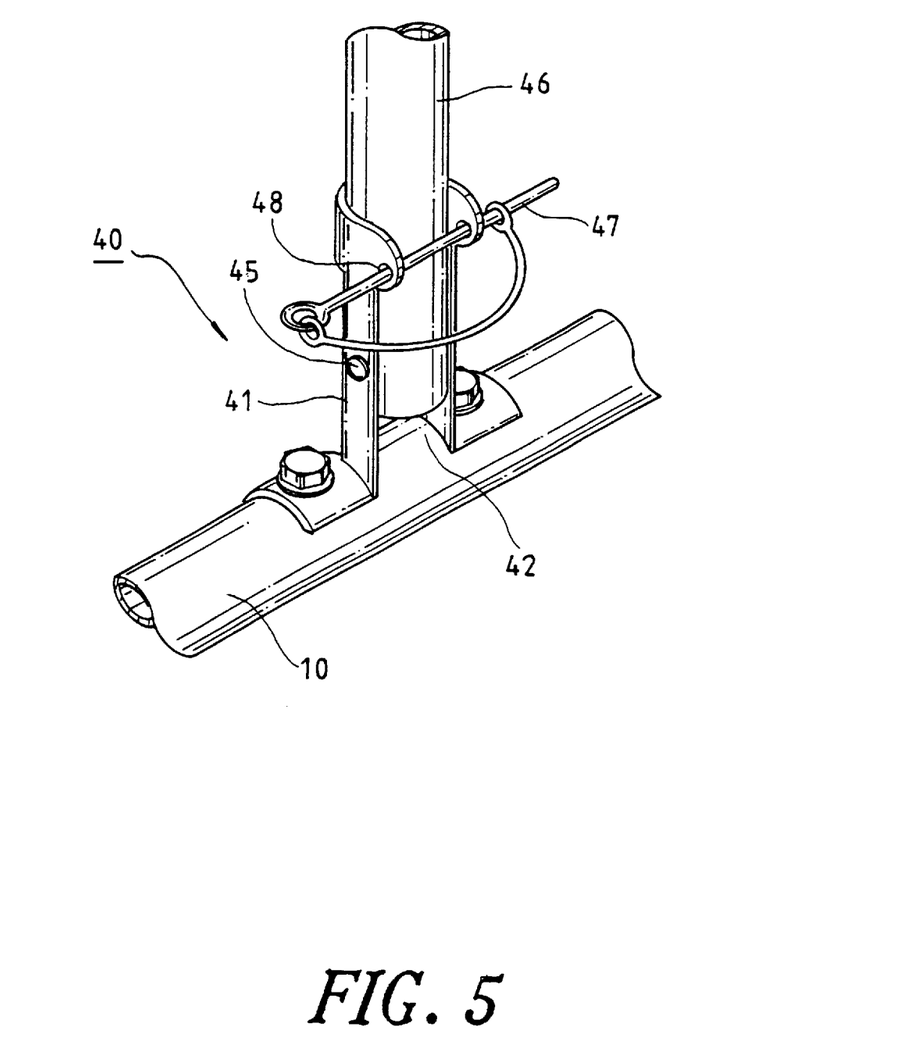
FIG. 5 is a perspective assembled view of the lower folder of the present invention.

Each lower folder 40 includes a frame seat 41. The inner sides of the frame seat 41 are formed with open sectional sections 42. The bottom board of the frame seat is formed with an arch edge 43. A bolt 44 is passed through the arch edges 43 to secure the frame seat 41 on the base frame 10. The lower support member 46 is fitted into the frame seat 41 and secured therein by a fixing pin 45. A movable pin 47 is passed through the pin holes 48 of the edges of the open sectional sections 42 so as to locate the lower support member 46. When it is desired to fold the upper support member 46, the movable pin 47 must be first extracted outward.

The movable pins 47 of the two lower folders 40 serve as the safety insertion pins for securely keeping the U-shaped support frame 20 and the base frame 10 in a stretched open state without folding. Therefore, the movable pins 39 of the upper folders 30 can be omitted.

Figure 7:
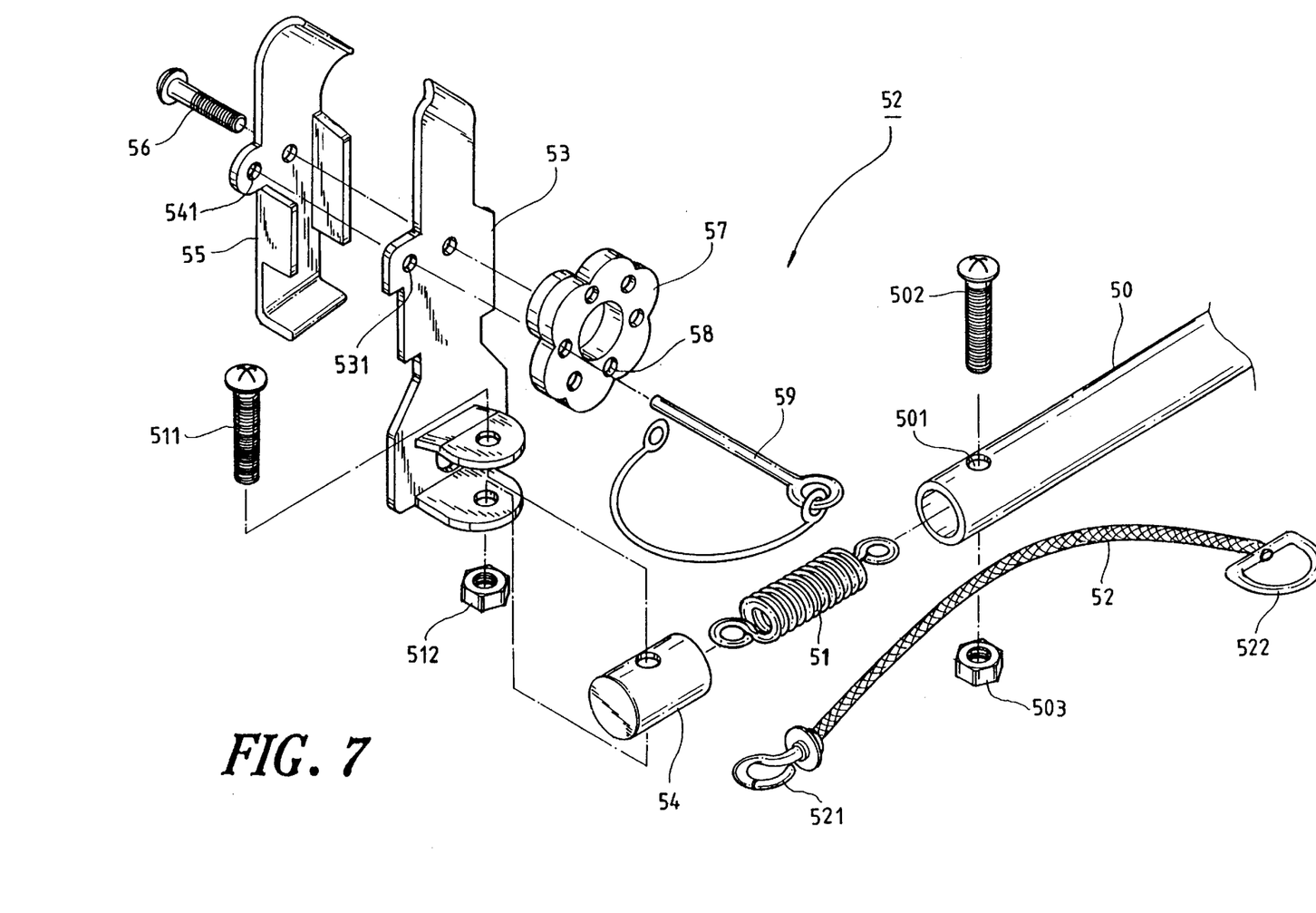
FIG. 7 is a perspective exploded view of the insertion pin seat of the drag link of the present invention.

The drag link 50 is a substantially straight but slightly curved lever. An insertion pin seat 52 is pivotally disposed at the front end of the drag link 50. The rear end of the drag link 50 by a pin member 504 is coupled with a locating board 505 welded on a lateral side of the base frame. Referring to FIG. 7, the front end of the drag link 50 is formed with a pin hole 501. A bolt 502 is passed through the pin hole to engage with a nut 503 for securing a shock absorbing spring 51 and a safety rope 52. Two ends of the safety rope 52 are respectively disposed with a hook body 521 and a ring body 522, whereby after the safety rope 52 is wound around a fixing article, the hook body 521 and the ring body 522 are resiliently latched with each other. The front end of the shock absorbing spring 5i is coupled with an insertion board 53 and a base seat 54 by means of a bolt 511 and a nut 512 fastened thereon. A clip plate 55 is attached to the insertion board 53 by a bolt 56 screwed into thread hole of a manually operable, plum blossom-shaped thread sleeve 57. The thread sleeve 57 is further formed with multiple pin holes 58, whereby a movable pin 59 is passed through the pin holes 531, 541 so as to prevent the thread sleeve 57 from loosening and securely lock the insertion pin seat 52 on the frame of the bicycle.

The wheels 70 are freely rotatably connected with the carriage by means of the wheel shaft 60 which is passed through the shaft holes 15 of the fixing plates 13 welded under the base frame 10.

Figure 6:
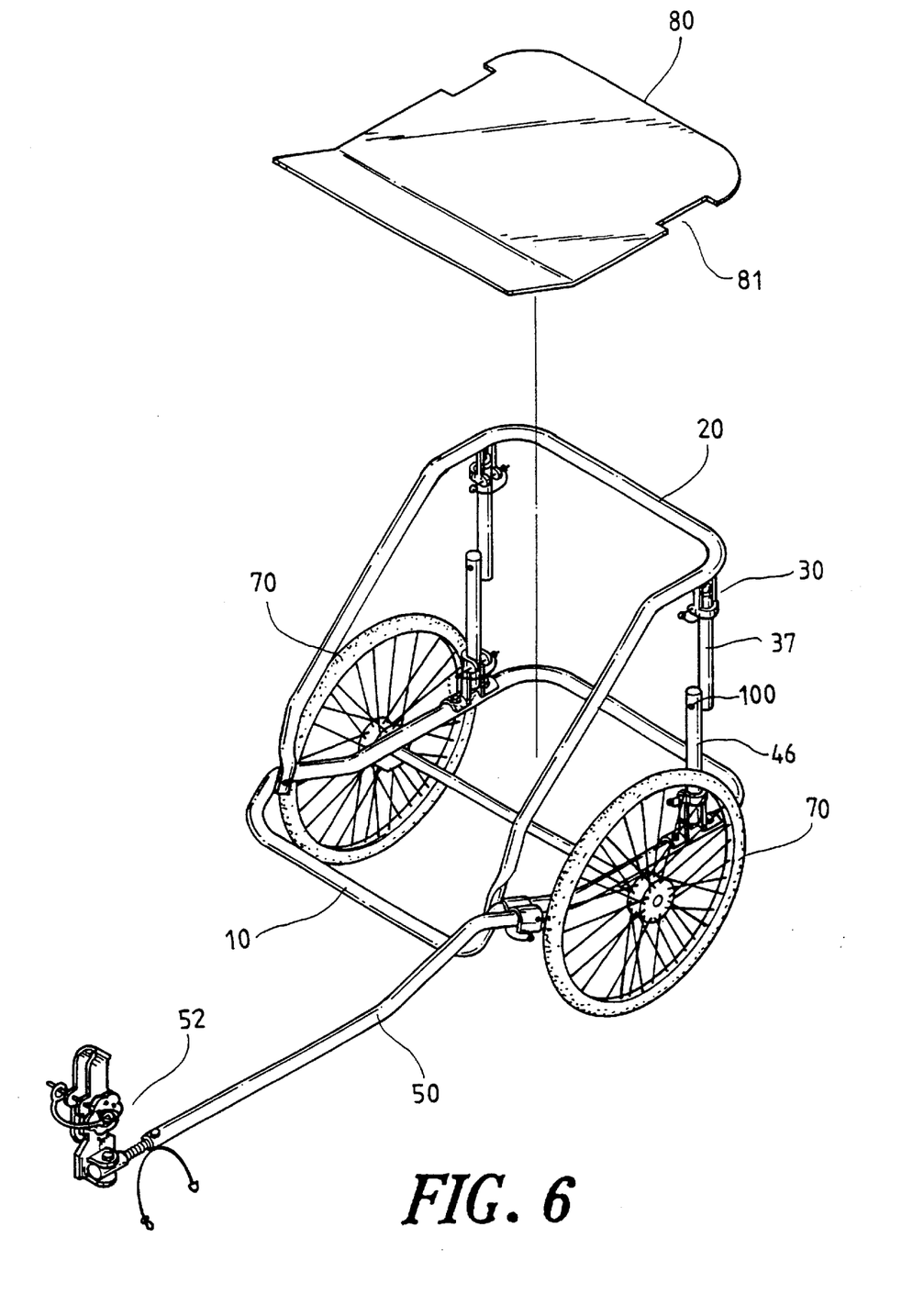
FIG. 6 shows that the base board is assembled with the base frame of the present invention.

The base board 80 is made of plastic material. After the base frame 10 and the support frame 20 are enclosed by the cover, the base board 80 is secured on the base frame 10 by the lateral locating recesses 81 (referring to FIG. 6).

The cover 90 is made of waterproof canvas by sewing. Two lateral sides of the cover are disposed with windows 91 made of mesh-like fabric. A turnable door 92 made of laminated mesh-like fabric and transparent plastic fabric is disposed on front side of the cover. A zipper 93 is disposed along the edge of the door for opening/closing the door. An openable door 94 is disposed on rear side of the cover, which can be opened by a zipper.

Figure 8:
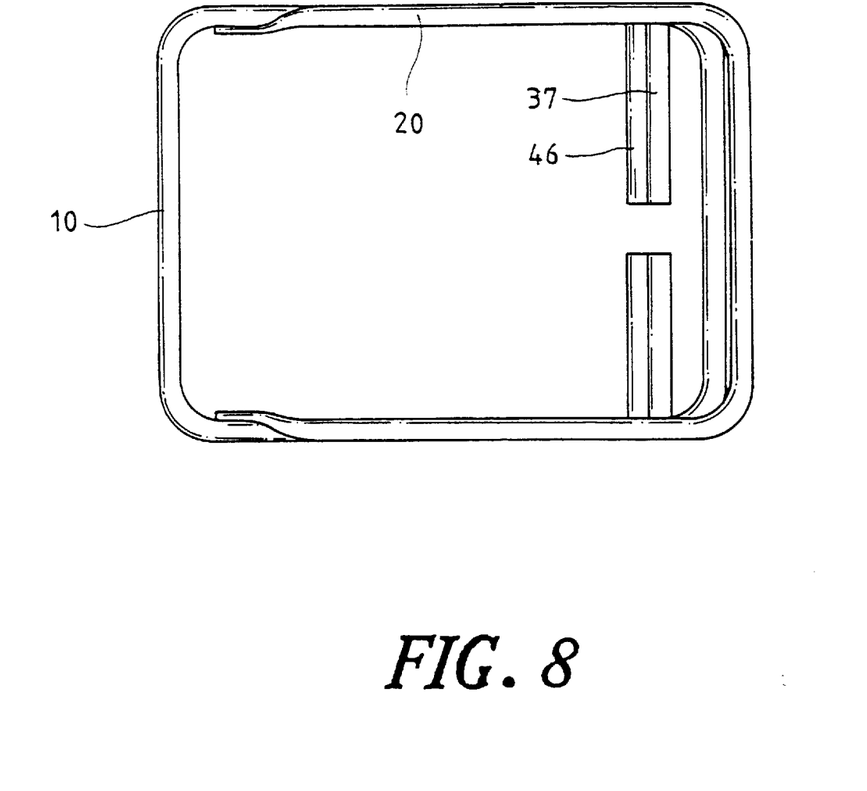
FIG. 8 is a top view of the base frame and the support frame in a folded state.
Figure 9:
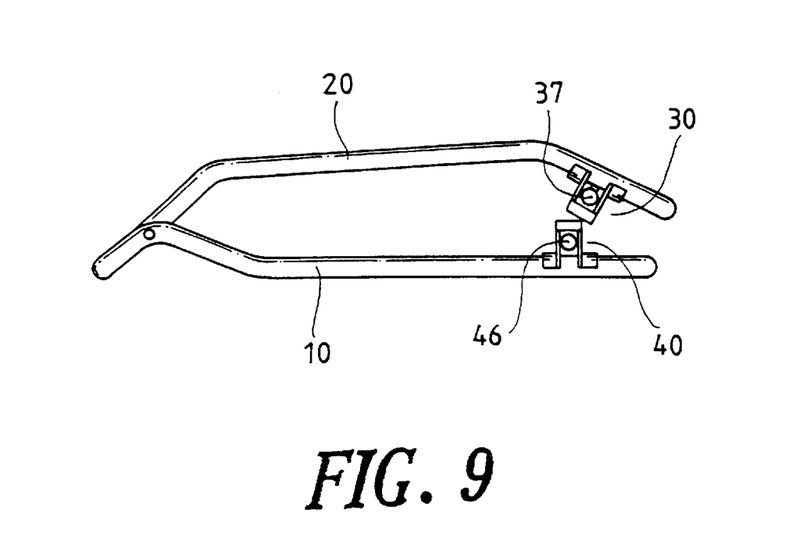
FIG. 9 is a side view according to FIG. 8.

Please refer to FIGS. 8 and 9. The upper and lower folders 30, 40 can be inward folded to collapse the upper and lower support members 37, 46 into a flat state. When assembling the carriage, the flat frame body is placed through the turnable door 92 into the cover 90. Then from the openable door 94, the upper and lower support members 37, 46 are stretched up in the cover. By means of passing the pin members 100 (referring to FIG. 2) into the pin holes 101 of the upper and lower support members, the base frame and support frame are constructed into a sitting frame body. Then the safety movable pin 39 or 47 is located. At this time, the plate boards 14 of the fixing seats 13 under the base frame 10 protrude below the cover 90, whereby the wheel shaft 60 can be rotatably fitted into the shaft holes 15 of the fixing plates 13 so as to rotatably mount the wheels 70 under the base frame.

The upper folder 30 is slightly different from the lower folder 40 in structure. This is because when the support frame 20 is pivoted upward and separated from the base frame 10, the pin holes 101 of the upper and lower support members 37, 46 must be stably coaxial so that the pin member 100 can be easily fitted into the pin holes. Otherwise, the pin member 100 can be hardly inserted therein. In consideration of this, the ball joint 35 of the upper folder 30 serves to universally deflect the pin holes 101 by a small angle so as to align the pin member 100 with the pin holes 101 and facilitate the assembly. The ball joint can be alternatively disposed on the lower folder to achieve the same effect.

According to the above arrangement, the bicycle carriage of the present invention can be easily and quickly assembled. Moreover, the upper and lower folders have simple structure, permitting the frame body to be collapsed for reducing the volume. Therefore, the bicycle carriage can be easily stored and transferred. The insertion pin seat is able to achieve higher security.

It is to be understood that the above description and drawings are only used for illustrating one embodiment of the present invention, not intended to limit the scope thereof. Any variation and derivation from the above description and drawings should be included in the scope of the present invention.

What is claimed is:

1. A foldable bicycle carriage comprising a base frame, a support frame, two upper folders, two lower folders, a drag link, a wheel shaft, two wheels, a base board and a cover, wherein:

the base frame is a rectangular frame body, a front end of the base frame being disposed with upward bent slip-proof sections, two fixing plates disposed with downward extending plate boards formed with shaft holes being welded under two lateral members of the base frame;

the support frame is a U-shaped frame having two free ends formed with thread holes;

each upper folder includes a frame seat for securing the upper folder under a rear edge of the support frame, the inner sides of the frame seat being formed with open sectional sections, a ball joint being screwed through the frame seat into the thread hole of the support frame, an end of an upper support member being formed with a fitting section for enclosing the ball joint, the fitting section being processed and riveted to universally rotatably fasten the ball joint in the frame seat;

each lower folder includes a frame seat for securing the lower folder on a rear edge of the base frame, the inner sides of the frame seat being formed with open sectional sections, a lower support member being fitted into the frame seat and secured therein by a fixing pin, a movable pin being passed through the pin holes of the edges of the open sectional sections so as to locate the lower support member;

the drag link is a substantially straight but slightly curved lever, an insertion pin seat being pivotally disposed at a front end of the drag link, a rear end of the drag link by a pin member being coupled with a locating board welded on a lateral side of the base frame;

the wheels are freely rotatably connected with the carriage by means of the wheel shaft which is passed through the shaft holes of the fixing plates welded under the base frame;

the base board is formed with two lateral locating recesses for securing the base board on the base frame; and the cover is made by sewing, two lateral sides of the cover being disposed with windows made of fabric, a turnable door made of laminated fabric and transparent plastic fabric being disposed on front side of the cover, an openable door being disposed on rear side of the cover, which can be opened by a zipper.

2. A bicycle carriage as claimed in claim 1, wherein the insertion pin seat is secured to a pin hole of the front end of the drag link, a bolt being passed through the pin hole to engage with a nut for securing a shock absorbing spring and a safety rope, a front end of the shock absorbing spring being coupled with an insertion board and a base seat by means of a bolt and a nut fastened thereon, a clip plate being attached to the insertion board by a bolt screwed into thread hole of a manually operable plum blossom-shaped thread sleeve to form a clip section, the thread sleeve being further formed with multiple pin holes, whereby a movable pin is passed through the pin hole so as to prevent the thread sleeve from loosening and securely lock the insertion pin seat on the frame of the bicycle.

3. A bicycle carriage as claimed in claim 1, wherein a movable pin is passed through the pin holes of the edges of the open sectional sections of the upper folders so as to locate the upper support member.

\* \* \* \* \*